No. 689,823. Patented Dec. 24, 1901.
J. LUCAS, L. E. DECKER & C. V. HOOVER.
MINER'S RATCHET DRILL.
(Application filed Feb. 23, 1900.)
(No Model.)
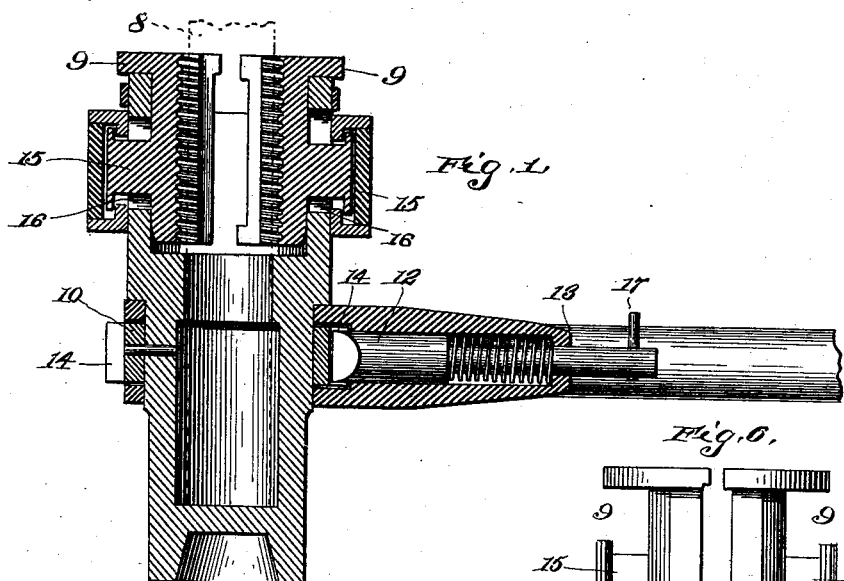
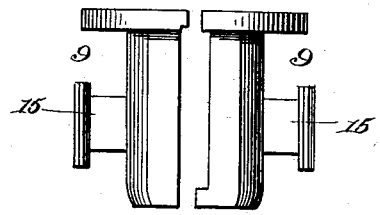
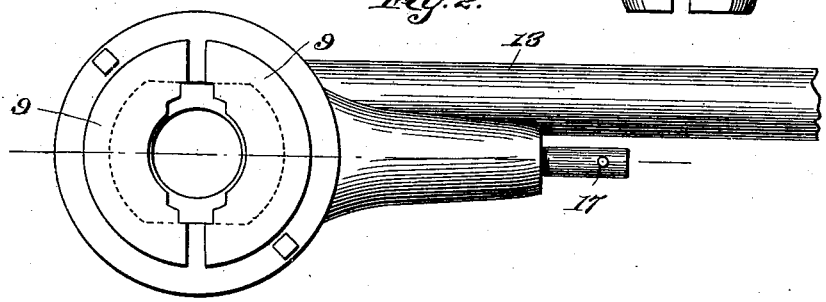
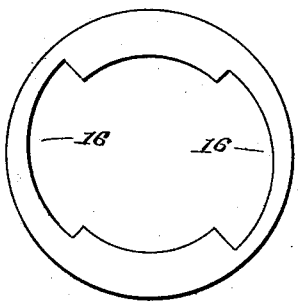
Witnesses:
John C. Quentel
John C. Gribben
Inventors:
James Lucas
Lucious Edward Decker
Claude V. Hoover
By W. J. Gladish, Attorney
THE NORRIS PETERS CO., PHOTO-LITHO., WASHINGTON, D. C.

UNITED STATES PATENT OFFICE.

JAMES LUCAS, LUCIUS EDWARD DECKER, AND CLAUDE VICTOR HOOVER, OF CHATTANOOGA, TENNESSEE.

MINER'S RATCHET-DRILL.

SPECIFICATION forming part of Letters Patent No. 689,823, dated December 24, 1901.

Application filed February 23, 1900. Serial No. 6,322. (No model.)

*To all whom it may concern:*

Be it known that we, JAMES LUCAS, LUCIUS EDWARD DECKER, and CLAUDE VICTOR HOOVER, citizens of the United States, residing at Chattanooga, in the county of Hamilton and State of Tennessee, have invented certain new and useful Improvements in Miners' Ratchet-Drills; and we do hereby declare the following to be a full, clear, and exact description of the invention, such as will enable others skilled in the art to which it appertains to make and use the same, reference being had to the annexed drawings, making a part of this specification, and to figures of reference marked thereon.

Figure 1 of the drawings is a section view of the drill complete. Fig. 2 is a plan of same. Fig. 3 is an end view of the ratchet-wheel. Figs. 4 and 5 are views showing in reverse the eccentricity of the grooves in the ratchet-wheel. Fig. 6 is an elevation of the two halves of the nut.

The same reference-figures indicate the same parts in all the views.

Our invention relates to improvements in that class of miners' drills that are revolved by a lever and fed in by a screw. Heretofore when the drill was fed in the length of the screw you had to back off and take the nut out of the socket and return the screw; but this construction is objectionable, as it was slow and complicated.

The object of our invention is to overcome this objection by opening the nut by an eccentric and return the screw.

The annexed drawings, to which reference is made, fully illustrate the improvement.

In the drawings, 8 is the screw. 9 is the nut, made in two separate halves, with projections or pins 15, that work in the eccentric grooves 16, made in the ratchet-wheel. These eccentric grooves are made in such shape that they will come together and clamp the nut on the screw when the lever is pulled forward, and they will open and release the screw when the lever is moved backward, so you can return the screw to the starting-point without delay.

In Fig. 1, 8 is the screw. 9 is the nut. 10 is the ratchet, with teeth 14 made like cogs, so the pawl 12 can move it either way. 13 is the lever. 15 is the projection on the nut. 16 shows the eccentric grooves in the ratchet-wheel. 17 is a handhold at the top of the pawl, so it can be reversed so as to move the ratchet backward.

Having thus described our invention, what we claim is—

In combination a drilling apparatus for mining and other purposes consisting of a screw and ratchet a nut made in two halves, with a lug on the back of each half, a cam working around the nut and the cam-grooves engaging the said lugs, a cog-wheel for a ratchet with a reversible pawl as shown and described for the purpose specified.

In testimony whereof we affix our signatures in presence of two witnesses.

JAMES LUCAS.
LUCIUS EDWARD DECKER.
CLAUDE VICTOR HOOVER.

Witnesses:
W. H. CRY,
A. GIBSON.